B. MERMELSTEIN.
TIRE PROTECTOR.
APPLICATION FILED JUNE 24, 1916.
1,227,289.
Patented May 22, 1917.
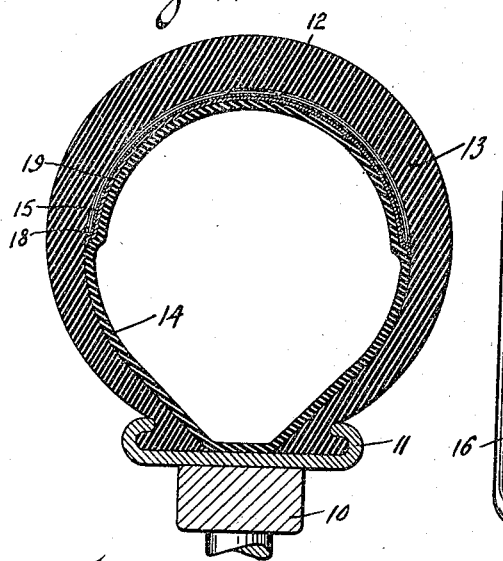
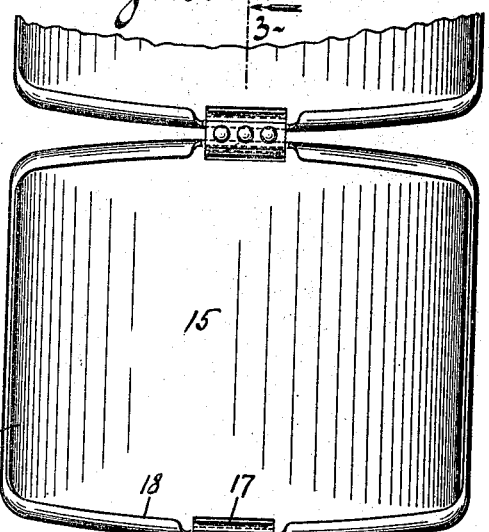
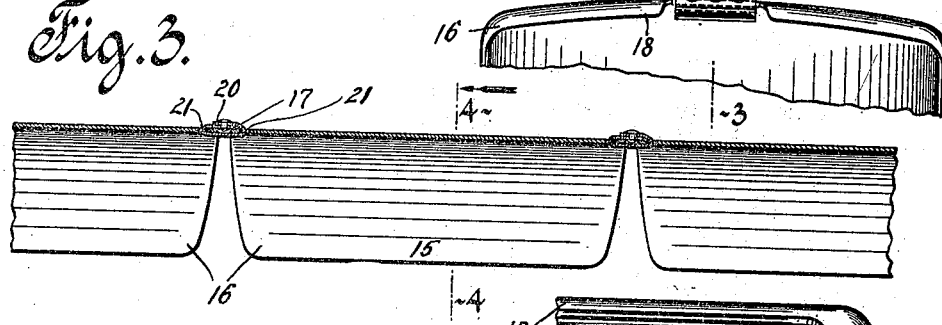
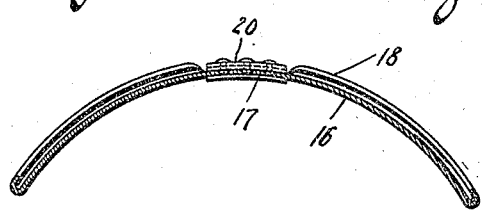
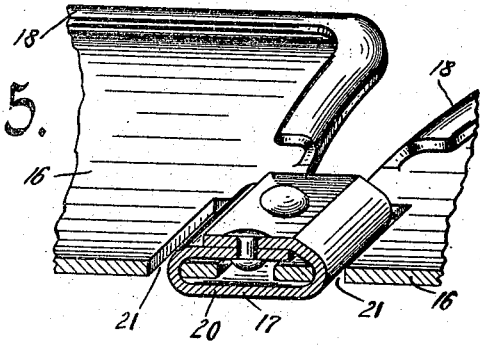
WITNESS
INVENTOR.
B. Mermelstein
BY
her ATTORNEY

UNITED STATES PATENT OFFICE.

BERTHA MERMELSTEIN, OF NEW YORK, N. Y.

TIRE-PROTECTOR.

1,227,289.  Specification of Letters Patent.  Patented May 22, 1917.

Application filed June 24, 1916. Serial No. 105,577.

*To all whom it may concern:*

Be it known that I, BERTHA MERMELSTEIN, a citizen of the United States, and a resident of the city of New York, in the county of Bronx and State of New York, have invented certain new and useful Improvements in Tire-Protectors, of which the following is a specification.

The present invention relates to pneumatic tire protectors of that class in which the protector is inserted loosely between the shoe or casing and the air tube.

The main object of the present invention is to provide an improved device of this character that is simple in construction, efficient in operation, and which can be quickly and conveniently applied to and removed from the tire.

Another object of the invention is to devise a construction of this type which can be manufactured on a commercial scale, or, in other words, one which is not so difficult to produce as to be beyond the reasonable cost of such a contrivance.

With these and other objects in view, which will more fully appear as the nature of the invention is better understood, the same consists in the combination, arrangement, and construction of parts hereinafter described, pointed out in the appended claim and illustrated in the accompanying drawings, it being understood that many changes may be made in the size and proportion of the several parts and details of construction within the scope of the appended claim without departing from the spirit or sacrificing any of the advantages of the invention.

One of the many possible embodiments of the invention is illustrated in the accompanying drawings, in which:—

Figure 1 is a cross section of a tire, with a device constructed in accordance with the present invention applied thereto; Fig. 2 is a plan view of a portion of the protector or lining; Fig. 3 is a section taken on line 3—3 of Fig. 2; Fig. 4 is a section taken on line 4—4 of Fig. 3; and Fig. 5 is a perspective view, partly in section, of a detail of construction of the protector or lining.

In the drawings the numeral 10 indicates the felly of a wheel, provided with a rim 11 of any suitable construction for holding the pneumatic tire 12. This tire comprises two parts, to wit: the outer casing or shoe 13, and the inner- or air- tube 14. The improved protecting lining consists of a shield 15, that is made of a plurality of sections 16, which are substantially oblong and joined by hinges 17 so as to permit of a relative movement between the same. These sections are, preferably, made of metal or other material that is to some extent yielding or resilient, each section being bent or curved transversely and also longitudinally to fit the inner face of the shoe 13. Each of these sections is provided with a flange 18 which extends all around the edges of the section, but is interrupted at the places where the hinges 17 are connected with the section. Each rim projects beyond the outer face of its section, that is to say, toward the inner face of the shoe, for a purpose hereinafter to be described.

The lining is interposed between the inner tube and the shoe of the tire, is of a width so as to partially envelop the inner tube, that is to say, that portion thereof which is apt to be injured in case the tread surface of the shoe is punctured by some sharp or pointed object on the road, such as, for instance, a nail. Between the lining and the inner tube there may be inserted a sheath 19, made of a flexible fabric, or other substance, for instance, felt. The purpose of this sheath is to prevent undue friction between the lining and the inner tube.

The hinges 17 may be of any suitable construction, for instance, they may consist each of a flat link 20, which is substantially O-shaped in cross section, and extends through slots 21, formed near to and in parallel relation to the transverse edges of two adjoining sections of the shield.

In assembling the tire, first the lining is placed thereinto with the flanges of the sections thereof engaging the inner face of the tread portion of the shoe. The sheath 19 is then placed upon the lining, and finally the air tube put in position in the shoe. When now the tire is mounted upon the rim and inflated in the proper manner, the inner shoe will hold the lining in position. When applied in the manner indicated, the lining prevents any puncture of the tire. Should a nail or other sharp pointed instrument pierce the tire shoe, it will be deflected by the lining and bent back by a flange, thereby preventing it from puncturing the inner tube below the protected section of the tire. In this the protector herein described differs mainly from the similar devices heretofore in use. As far as known, one type of the devices heretofore used comprises hinged or otherwise joined protecting sections, which, however, lack the flanges herein described. They allow, therefore, the nail or other instrument to pierce or puncture the inner tube below their edges.

The lining may be made in the form of an endless band. For the purpose of adapting it, however, to tires of varying sizes, it may be, preferable, not to secure the ends of the band together.

What I claim is:

A protecting lining for a pneumatic tire, consisting of a plurality of short connected substantially oblong sections curved transversely to fit the inner face of the shoe of a pneumatic tire, each section being provided all around with a curved flange projecting toward and into contact with the shoe, the flange portions on opposite boundary lines of each section being curved in opposite directions and their free edges being spaced from the body portion of the section and projecting toward the center thereof.

Signed at the city of New York, in the county of New York, and State of New York, this 21st day of June, A. D. 1916.

BERTHA MERMELSTEIN.

Witnesses:
DAVID MINTZ,
ESTHER GUVIRE.